July 7, 1959
H. McKEE
2,893,154
DECOY
Filed May 24, 1957
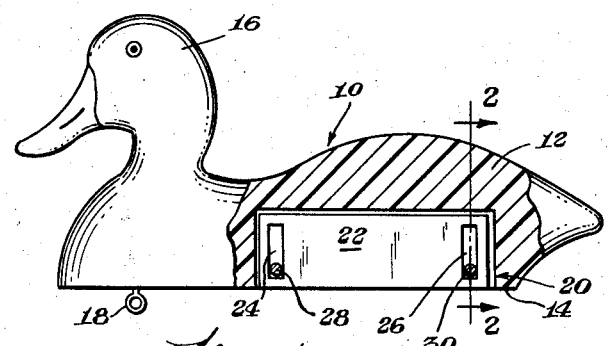
Fig. 1
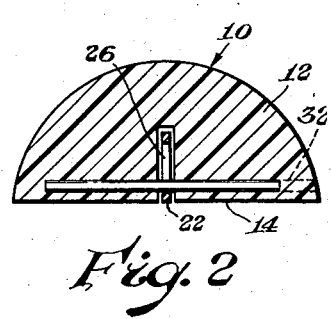
Fig. 2
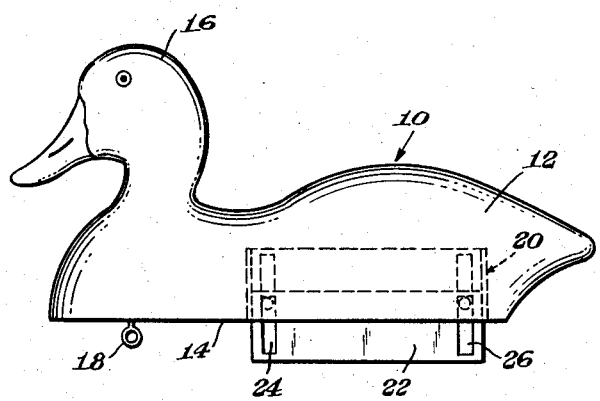
Fig. 3
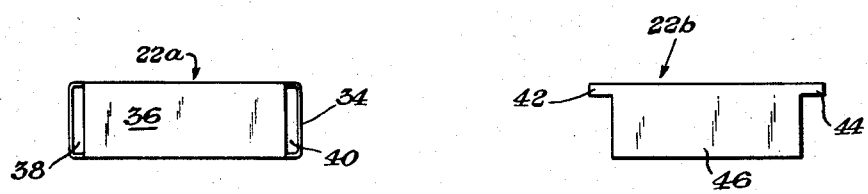
Fig. 4
Fig. 5
INVENTOR.
Harold McKee
BY
Earl D. Ayers
AGENT United States Patent Office 2,893,154
Patented July 7, 1959

2,893,154
DECOY
Harold McKee, Midland, Mich.
Application May 24, 1957, Serial No. 661,485
7 Claims. (Cl. 43—3)

This invention relates to wildfowl decoys and particularly to wildfowl decoys which have keels attached thereto.

Wildfowl decoys which have no keels when afloat often move over the water in movement or manner which is not natural. Thus, although the decoy may faithfully copy the body shape and body color of a particular wildfowl, unless the decoy exhibits a motion in the water which is not un-natural to wildfowl, no wildfowl will be fooled into coming into range of a hunter's gun.

Adding a keel below the body of a decoy does much to stabilize the movement of the decoy and prevent un-natural movements caused by water currents or breezes which strike the body of the decoy.

Keels are usually permanently attached to the bottom of the decoys. Thus, when the decoys are stacked after being removed from the water, the protruding keels often mar the painted surface of other decoys which they contact. Further, the protruding keel, if large enough to be of real benefit to the decoy, adds considerable to the bulk of the decoy and adds considerable to the space required to store the decoys.

Accordingly, a principal object of this invention is to provide an improved wildfowl decoy which has a keel which, during storage, is no more bulky than a similar decoy which has no keel.

Another object of this invention is to provide an improved, light weight wildfowl decoy which exhibits life-like movement when afloat.

In accordance with this invention there is provided a wildfowl decoy having a buoyant body which has a slot in the under-side thereof. A plate-like keel having stop means thereon is disposed within the slot and prevented from being removed from the slot by transversely disposed keel movement limiting members which extend across the slot within the body of the decoy.

The invention, as well as additional objects and advantages thereof, will best be understood when the following detailed description is read in connection with the accompanying drawing, in which:

Fig. 1 is a side elevational view, partly broken away and in section of a decoy having a retractable keel in accordance with this invention;

Fig. 2 is a sectional view taken along the line 2—2 of Fig. 1;

Fig. 3 is a side elevational view of the decoy of Fig. 1 shown with the keel extended downwardly;

Fig. 4 illustrates an alternative type of retractable keel in accordance with this invention, and Fig. 5 illustrates a further alternative type of retractable keel in accordance with this invention.

Referring to the drawings, particularly to Figs. 1, 2 and 3, there is shown a wildfowl decoy, indicated generally by the numeral 10 having a body part 12 made of buoyant material, such as an expanded cellular material of which expanded polystyrene is an example. The body 12 is shaped on its upper side to conform with the body contours of a particular type of wildfowl, but the bottom part 14 of the decoy 10 is usually, but not necessarily, flat.

The head 16, and neck of the decoy 10 are usually manufactured separately from the body part 12 and are later attached to the body 12 by an adhesive, or by means of the ring bolt 18, or both.

The body 12 of the decoy 10 contains a slot disposed symmetrically with respect to the longitudinal axis thereof and indicated generally by the numeral 20. The length and depth of the slot 20 depends on the size of the decoy 10 and the size of the keel 22 which is to be disposed in the slot 20. The slot 20 is so disposed along the length of the decoy 10 that when the keel 22 is extended downwardly (as in Fig. 3) and the decoy is floating in water, it will assume a natural look.

The keel 22 comprises a flat sheet-like member which is usually longer than it is wide and is usually, but not necessarily, of rectangular configuration. For example the keel 22, as made for a medium size decoy, weighs about one pound, measures about two and one-half inches by six inches, and is about one-eighth inch thick. The keel 22 is preferably made of lead, lead alloy, or other heavy metal. The keel 22 contains a pair of vertically extending slots 24, 26, one slot 24 or 26 being disposed near to each end of the keel 22. The slots 24 and 26 in the above described keel 22 were two inches long and five-sixteenths inch wide, extending completely through the keel.

The keel 22 is retained within the slot 20 by means of pegs 28, 30 which extend transversely through at least part of the body part 12 and across the slot 20. The pegs 28, 30 are inserted into the body 12 through a bore (the bore 32 is indicated in Fig. 2) which extends through a major part of the body width, the bore preferably being parallel with the horizontal bottom part 14 of the decoy. After the pegs 28, 30 are inserted into the body part 12, the bores are plugged. The use of relatively long pegs 28, 30 assures long usage of the decoy 10 with little possibility that the pegs will wear their way through the cellular body material of the decoy.

In assembling the decoy, the keel 22 is inserted into the slot 20 with the keel slots 24, 26 aligned with the bores (not shown as such except for bore 32 in Fig. 2) through which the pegs 28, 30 are to extend. The pegs 28, 30 (which may be made of wood, hollow tubing or other suitable material) are then inserted through the bores, passing through the keel slots 24 or 26. The bores are then plugged and the outer surface of the decoy 10 is painted or otherwise colored in accordance with the coloring of the particular wildfowl the decoy represents.

As may be seen in Fig. 1, the keel 22 may be retracted entirely within the body of the decoy 10. Since decoys are usually attached by a cord (connected to ring bolt 18) to a hunting blind or anchoring device, the cord (not shown) is usually wrapped around the body of the decoy 10 as the decoy 10 is removed from the water. Thus, the cord which is wrapped around the body of the decoy 10 holds the retracted keel within the body 12 of the decoy 10. However, if desired, a separate catch mechanism could be added to the keel to retain the keel inside the decoy body 12 during storage of the decoy.

As shown in Fig. 3, when the decoy 10 is placed in the water, the keel 22 drops, acting both as a rudder and stabilizing element for the decoy.

While the form of keel 22 shown in Figs. 1, 2 and 3 is preferred because it may be easily cast in one piece, other forms of keels 22a and 22b, shown in Figs. 4 and 5, respectively may be used.

The keel 22a comprises a heavy rectangularly shaped wire frame 34 to which is fastened a sheet-like member 36. The sheet-like member 36 is disposed between the ends of the frame 34, being spaced from the ends to provide slots 38, 40 through which the keel retaining rods or pegs 28, 30 may extend.

The keel 22b may also be cast in one piece, as it is essentially a rectangular plate with keel stop engaging arms 42, 44 extending from the top of the body 46 of the keel 22b.

The keel 22b, however, possesses the disadvantage that the effective length of the keel is small compared to the length of slot 20 of the decoy body 12 which is required to accommodate that keel.

When decoys in accordance with this invention are used, the decoys will remain upright even in rough water, will float with a simulated natural motion on the water, and may be stored or stacked without the keel causing any marring or denting of the bodies of other decoys.

What is claimed is:

1. A wildfowl decoy comprising a simulated wildfowl having a buoyant body, the upper part of said body conforming to the upper part of a wildfowl and the bottom part of said body including a flat part having a recess therein, said recess being symmetrically disposed with respect to the longitudinal axis of said body and extending longitudinally with respect to said body, the recess extending into the body from the bottom thereof and being of substantially uniform width throughout its length and depth, a plate-like keel having a forward end and a rear end, said keel being shaped to fit loosely within said recess in the body of the decoy and adapted to move vertically within said recess, said keel having vertical movement stop means, and rod-like means extending into said recess and adapted to engage said vertical movement stop means, said rod-like means extending transversely across the recess in said decoy body.

2. A wildfowl decoy in accordance with claim 1 wherein said keel is a rectangularly shaped plate having a vertically extending open section near each end thereof, and said vertical movement stop means comprises the upper and lower edges of said open sections.

3. A wildfowl decoy in accordance with claim 1, wherein said keel comprises a wire-like rectangular frame and a flat member disposed between and near to both the forward and rear ends of the keel.

4. A wildfowl decoy in accordance with claim 1, wherein said keel comprises a block-like plate and said vertical movement stop means is a pair of keel elements which extend from the forward and rear ends of the plate.

5. A wildfowl decoy in accordance with claim 1, wherein said rod-like means comprise a pair of tubular members embedded in said decoy body.

6. A wildfowl decoy in accordance with claim 5, wherein said tubular members are several times as long as the width of said recess in the body of said decoy.

7. A wildfowl decoy in accordance with claim 1, wherein said recess in said decoy body is at least as deep as the height of said keel.

References Cited in the file of this patent

UNITED STATES PATENTS

| | | |
|---|---|---|
| 1,923,442 | Kilgore | Aug. 22, 1933 |
| 2,510,843 | Townshend | June 6, 1950 |
| 2,536,736 | Gazalski | Jan. 2, 1951 |